Sept. 18, 1934.　　　C. E. NORTH　　　1,973,772

MILK PASTEURIZING APPARATUS

Filed June 23, 1928　　　5 Sheets-Sheet 1

INVENTOR
*Chas. E. North*
BY
ATTORNEY

Sept. 18, 1934. C. E. NORTH 1,973,772
MILK PASTEURIZING APPARATUS
Filed June 23, 1928  5 Sheets-Sheet 2

INVENTOR
Chas. E. North
BY T. F. Bourne
ATTORNEY

Sept. 18, 1934. C. E. NORTH 1,973,772
MILK PASTEURIZING APPARATUS
Filed June 23, 1928 5 Sheets-Sheet 3

INVENTOR
Chas. E. North
BY
ATTORNEY

Patented Sept. 18, 1934

1,973,772

UNITED STATES PATENT OFFICE 1,973,772

MILK PASTEURIZING APPARATUS

Charles Edward North, Montclair, N. J., assignor to The Creamery Package Mfg. Company, Chicago, Ill., a corporation of Illinois Application June 23, 1928, Serial No. 287,715

26 Claims. (Cl. 137—21)

My invention relates to improvements in apparatus for the pasteurization of milk and has particular reference to improvements in so-called "holders" for the storage or keeping of milk for a desired period of time at a required temperature, such as, for instance, at a minimum temparture of 142° F. for a minimum time of 30 minutes. My invention comprises improvements in the class of pasteurizing apparatus set forth in my application filed Nov. 29, 1926, Serial No. 151,362.

One of the objects of my invention is to provide improved means to cause supply and discharge pipes for the milk to enter and recede from separate containers, substantially simultaneously and periodically, which containers are arranged in series concentrically disposed.

Another object of my invention is to provide simple and improved means for rotatively operating the milk supply and discharge pipes, with respect to the several containers, periodically and to periodically cause the discharge from a container of pasteurized milk.

In carrying out my invention I provide a series of annularly disposed containers or tanks in which the milk is to be held (which comprise the milk holder) and rotatively supported supply and discharge pipes adapted to enter and recede from said containers, said pipes being rotatively supported in such a way as to be stepped or moved annularly with respect to successive containers, means to conduct milk to the supply pipe, means to conduct milk from the discharge pipe, valve-means to control the flow of milk through the supply and discharge pipes, and means to periodically cause the supply and discharge pipes to enter and recede from the containers and to rotate from one container to another when raised from the former.

My invention also comprises novel details of improvement and combinations of parts that will be more fully hereinafter set forth and then pointed out in the claims.

Reference is to be had to the accompanying drawings forming a part hereof, wherein

Fig. 8a is a detail view on line 8a, 8a, Fig. 7;

Similar numerals of reference indicate corresponding parts in the several views.

Figure 1:
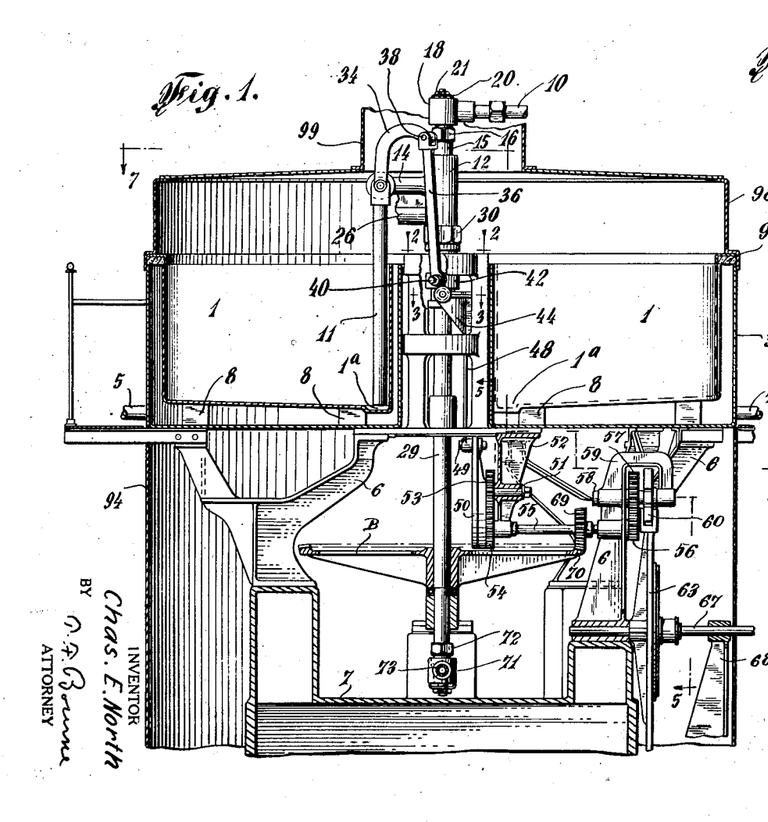
Fig. 1 is a vertical section of a pasteurizing apparatus embodying my invention, substantially on the line 1, 1, in Fig. 7.

The milk holder illustrated includes a series of annularly disposed containers, tanks or compartments 1. The containers 1 may be of any form well known in the pasteurizing art, being illustrated as separate tanks radially disposed, providing a space at 2 concentrically disposed with respect to the inner sides of the containers. The containers 1 are shown located within a shell or casing 3, which may be supplied with steam through pipes 4 and 5 (Fig. 1). The shell 3 is shown carried upon supports 6 rising from a base 7, and within the shell are blocks or supports 8 upon which the containers rest in such a manner that they may be readily removed therefrom. Packing at 9 (Fig. 1) is provided between the containers 1 and the shell 3.

Figures 7, 8:
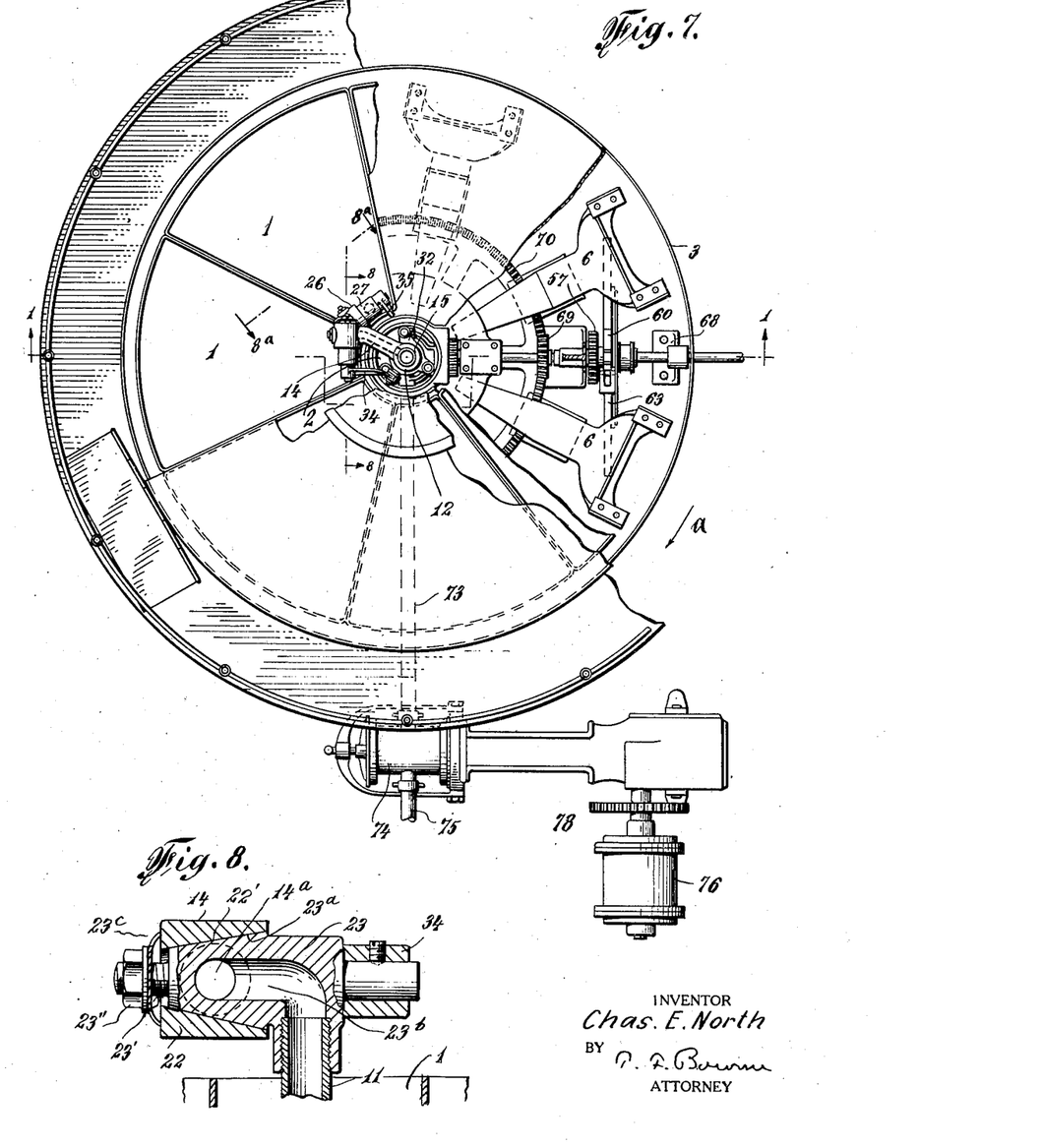
Fig. 7 is a partly sectional plan view substantially on the line 7, 7, in Fig. 1.
Fig. 8 is an enlarged detail of valve means for the supply and discharge pipes, substantially on line 8, 8, in Fig. 7.
Figures 8, 9, 10:
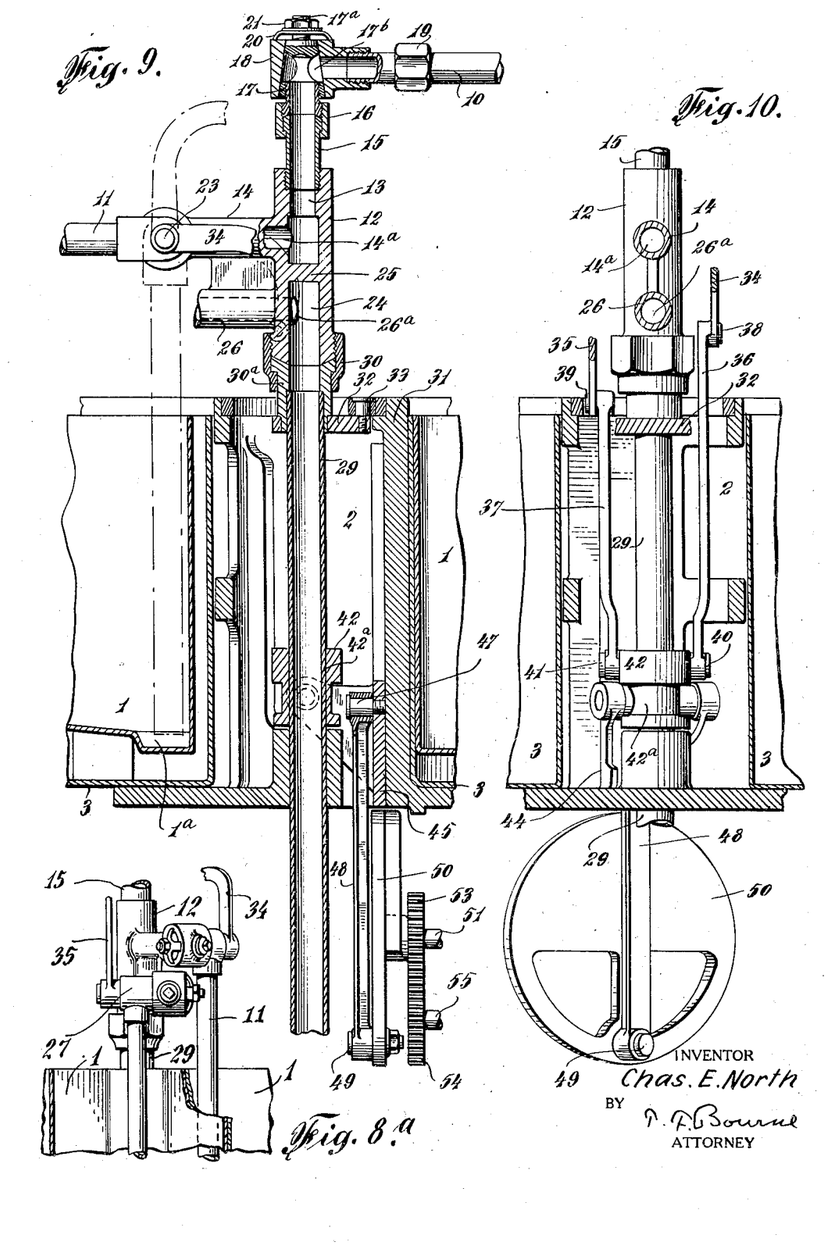
Fig. 9 is an enlarged sectional detail view substantially on the plane of the line 9, 9, in Fig. 3.
Fig. 10 is a detail section on line 10, 10, in Fig. 2.

An inlet pipe for the milk is indicated at 10, through which the heated milk may be supplied by gravity from an overhead tank, or in any other desired way. At 11 is a supply pipe for the heated milk adapted to enter and recede from the containers 1, which pipe 11 is rotatively supported adjacent to its milk receiving end and is adapted to be placed into communication with the pipe 10 to receive milk therefrom when the pipe 11 depends into a container 1 (Fig. 1). Valve-means are provided between pipes 10 and 11 adapted to permit the milk to flow from pipe 10 into a container or tank 1, when pipe 11 is in the position shown in Fig. 1 and to cut off the milk supply when pipe 11 is in the position shown in Fig. 9. A fitting 12 is provided with a bore 13 to receive milk and with a branch or arm 14, having a bore 14a, communicating with a bore 13. The fitting 12 is shown provided with a nipple or tube 15 that is connected by a union 16 with a valve stem 17 shown in tapering form rotative in the valve shell 18, which shell is shown connected by union 19 with the pipe 10. At 20 is a spring that bears against shell 18 and is opposed by a nut 21 on the threaded end portion 17a of valve stem 17, whereby the tapering valve stem 17 is maintained against its corresponding seat in casing 18 to prevent leakage and permit rotation of fitting 12 while a supply of milk is maintained, in all positions of the parts, through the annular passage 17b in the stem 17 (Fig. 9). The outer or free end of branch 14 is provided with valve means connected with supply pipe 11. I have illustrated the outer end portion of branch 14 as a casing 22 provided with a laterally disposed tapering valve seat 22, against which a corresponding tapering surface 23a of valve member or stem 23 is rotatively fitted. The stem 23 has a threaded portion 23' provided with a nut 23'' bearing against a spring-washer 23c that bears against extension 14 to keep the valve stem firmly against its seat 22' and permit free rotation of the valve stem.

Figure 2:
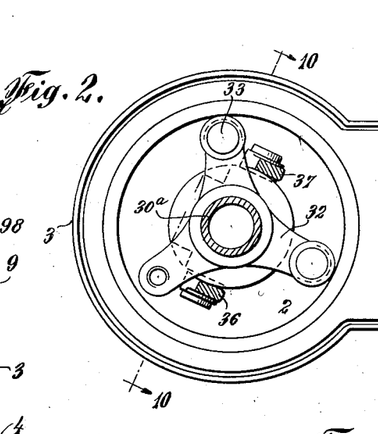
Fig. 2 is an enlarged section on line 2, 2, in Fig. 1.
Figure 3:
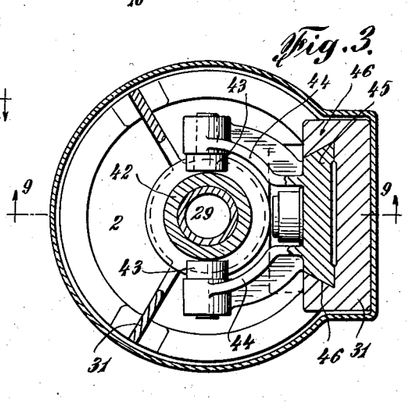
Fig. 3 is an enlarged section on line 3, 3, in Fig. 1.

The pipe 11 is secured to valve member or stem 23 so as to project outwardly therefrom whereby said pipe may be rotated on a horizontal axis through the valve stem as said valve stem is provided with a bore 23b in communication with pipe 11 (Fig. 8) and opening through a side of the stem to communicate with bore 14a of branch 14 when pipe 11 depends into a container 1, and whereby when pipe 11 is raised above the container the bore 23a will be out of register with bore 14a to cut off the supply of milk through pipe 11. The fitting 12 is also provided with a second bore 24 that is out of communication with the bore 13, said bores being shown separated by a partition or wall 25, so that heated milk that passes to the holder through bore 13 and pipe 11 will not come in contact with pasteurized milk from the holder that is discharged therefrom through the bore 24 (Fig. 9). The fitting 12 is also provided with a second branch or arm 26 having a bore 26a that communicates with the bore 24, and the outer end of branch 26 is provided with a valve stem or member 27 (Figs. 7 and 8a), which branch and stem have tapering seats and bores arranged similarly to that described with respect to branch 14 and valve stem 23 of Fig. 8, the axis of stem 27 being horizontally disposed and the bore of said stem extending laterally in such a position that when discharge pipe 28, that is connected with stem 27 and communicates with its bore, depends into a container 1 (at the time the pipe 11 depends into an adjacent container to supply milk thereto) pasteurized milk may be discharged from the corresponding container through pipe 28 into bore 24 of fitting 12, as by means hereinafter described. The containers 1 are shown provided with depressions or pockets 1a, (Figs. 1 and 9), into which the lower ends of the pipes 11 and 28 may enter, to assure substantially complete discharge of each container through pipe 28, the bottoms of the containers being shown inclined toward said depressions to cause the milk to flow into the depressions. The lower portion of fitting 12 is connected with an outlet pipe 29 for discharge of the pasteurized milk, a union 30 being shown detachably connecting said parts (Fig. 9). Within the space 2 (between the inner ends of the containers of tanks 1) is located a frame or casting 31, open vertically, and supported upon the corresponding supports 6 (Figs. 1, 9 and 10), which frame or casting is shown provided at its upper portion with a spider 32 upon which the member 30a of union 30 rests, whereby the fitting 12 and the parts attached thereto as well as the outlet pipe 29 are supported rotatively and axially with respect to the containers 1. The spider 32 may be detachably secured at the upper portion of frame 31 by means of screws 33 (Figs. 2 and 9).

It is intended that the fitting 12 with the valves and the pipes 11 and 28 attached thereto, as well as outlet pipe 29 shall be rotated periodically with respect to the vertical axes of fitting 12 and pipe 29, and that the pipes 11 and 28 shall be caused to enter and recede from successive containers or tanks 1 periodically for substantially simultaneously charging and discharging successive containers. To accomplish such purposes I have illustrated means as follows:—

Figure 6:
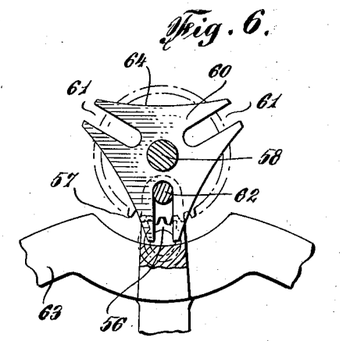
Fig. 6 is an enlarged detail of part of Fig. 5.

To the stem 23 is secured an arm 34 and to the stem 27 is secured an arm 35 (Fig. 7) to the outer ends of which arms are pivotally attached depending links 36 and 37, as by means of suitable pivots at 38 and 39 (Fig. 10). The arms 34 and 35 are suitably curved, (Fig. 1), and are shown located on opposite sides of fitting 12 (Fig. 10). The lower ends of the links 36 and 37 are pivotally connected, respectively, at 40 and 41 with a member 42 having a bore 42a slidably receiving the pipe 29, so that said member may be reciprocated along said pipe. Member 42 is shown provided with an annular groove 42a receiving projections 43 that extend inwardly from spaced arms 44 that project from a slidable block 45, guided in ways 46 in a side portion of frame 31, (Figs. 1, 3, 7, 9, and 10). The block 45 is pivotally connected at 47 with a depending link 48 pivotally connected with a crank pin 49 carried by a disk or crank arm 50 having a shaft 51 journaled in a bearing in a bracket 52 depending from one of the supports 6 (Figs. 1 and 9). The shaft 51 is provided with a gear 53 in mesh with a gear 54 carried by a shaft 55, shown journaled in a bearing in bracket 52 and in a bearing in one of the supports 6. It is intended that shaft 55 shall be rotated step by step or periodically, for which purpose said shaft is shown provided with a gear 56 in mesh with a gear 57 secured on shaft 58 of a means to rotate said shaft intermittently, which I have illustrated as a Geneva movement (Figs. 1, 5, 6, and 7). Shaft 58 is shown journaled in bearings in a yoke 59 carried by one of the supports 6 (Fig. 1). To the shaft 58 is secured the member 60 of a Geneva movement shown provided with three radial slots 61 adapted to receive the projection 62 from the other member 63 of the Geneva movement, whereby each time that member 63 and its projection 62 makes a complete rotation the member 60 will be rotated one-third of a revolution. The curved surfaces 64 of member 60 are adapted to engage the annular surface 65 of the member 63 to retain the member 60 from rotation during rotation of member 63 until the recessed portion 66 of member 63 (adjacent to which portion the projection 62 is located) arrives with projection 62 adjacent to member 60 whereby the member 62 will enter one of the slots 61 (Fig. 5) and cause one-third rotation of member 60 (Fig. 6). The Geneva member 63 is shown carried by shaft 150

67, journaled in bearings in one of the supports 6 and in bracket 68 suitably supported on the base of the machine (Fig. 1). The Geneva member 63 may be rotated by any suitable drive mechanism having a constant speed of rotation as may be required. The shaft 55 is provided with a gear 69 in mesh with a gear wheel 70 that is secured to pipe 29 (Figs. 1 and 7) for rotating the latter. The ratio of the gearing described is such that for each one-third rotation of the Geneva member 60 the crank pin 49 will be given one complete rotation to cause the pipes 11 and 28 to be moved from the depending position shown in Fig. 1 to the horizontal position shown in Fig. 9 and back to the said depending position, and simultaneously the pipe 29 by means of the gears 69 and 70 will be rotated one-seventh of a revolution. The arrangement described is such that when the pipes 11 and 28 have been raised out of adjacent containers 1, the pipe 29 with the pipes 11 and 28 will be rotated in the direction of the arrow $a$ in Fig. 7 one-seventh of a revolution to bring said pipes respectively over next adjacent containers and said pipes 11 and 28 will then be lowered into said containers and the rotation of pipe 29 will stop, and so on in successive manner.

Figure 4:
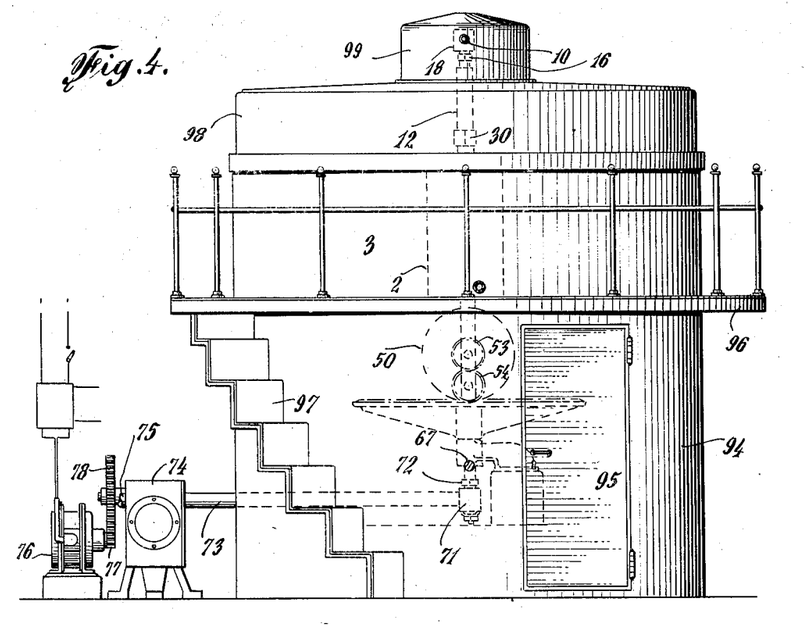
Fig. 4 is a side elevation of my improved apparatus.
Figure 5:
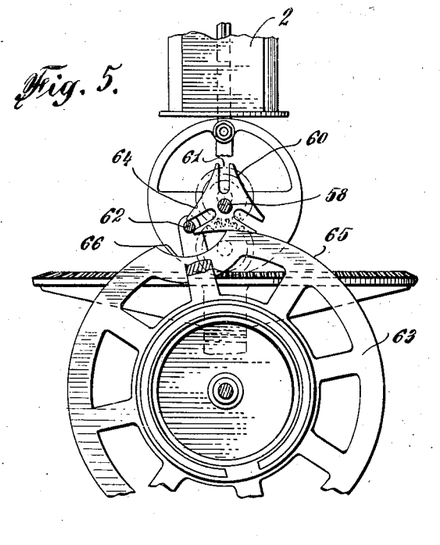
Fig. 5 is a sectional view substantially on line 5, 5, in Fig. 1.
Figures 11, 12:
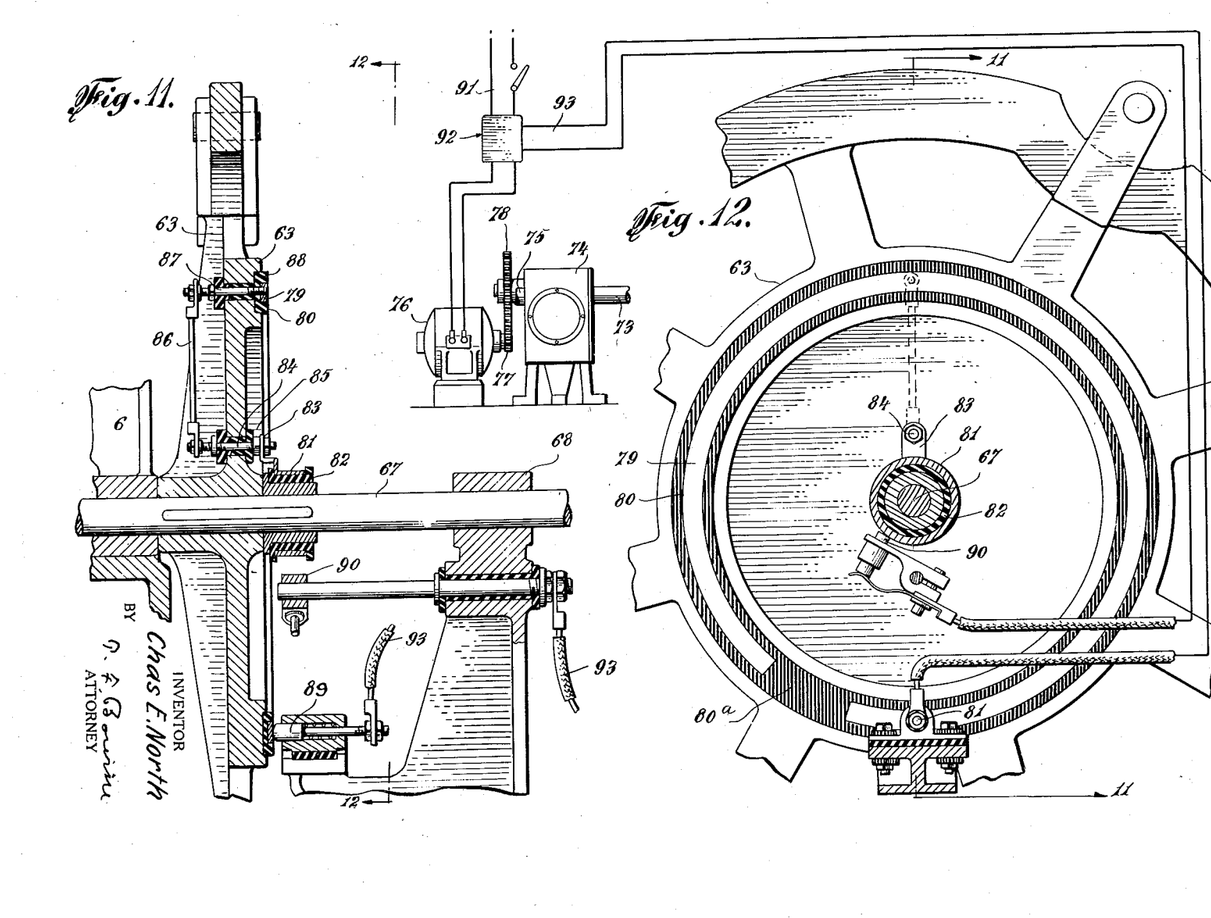
Fig. 11 is an enlarged sectional view on line 11, 11, in Fig. 12.
Fig. 12 is a detail side view partly in section on line 12, 12, in Fig. 11.

I provide means for pumping the pasteurized milk from the containers 1 successively, after the milk has been held in a container for a required period of time at a required temperature, say after holding for 30 minutes at a minimum temperature of about 142° F. in each container. The lower end of outlet pipe 29 is connected with a valve mechanism similar to that shown in Fig. 9, indicated in Fig. 1 at 71, by means of a union at 72, so that pipe 29 will rotate while the fitting 71 remains stationary. A discharge pipe 73 is connected with the fitting 71 (Figs. 1, 4, and 7) and leads to a pump 74 from which the pasteurized milk may be delivered through the outlet pipe 75. The pump may be operated by an electric motor indicated at 76 and connected with a pump by gearing 77, 78. The pump is to be operated in timed relation to the rotation of pipe 29, during the time that said pipe is stationary, and the pump will be stopped during the time that pipe 29 is rotated. For such purpose I have shown the Geneva member 63, provided with an annular contact 79, carried by insulation 80, secured to one face of said member 63 and interposed between the spaced ends of contact 79 at 80$a$, (Fig. 12). An annular contact 81 is shown carried by insulation 82, mounted upon shaft 67, (Fig. 11). The contacts 79 and 81 are electrically connected by means of projection 83 from contact 81 in engagement with bolt 84 passing through insulation 85, carried by member 63 said bolt being shown connected with conductor 86 and connected to a bolt 87 that passes through insulation 88 carried by member 63 and is engaged with contact 79 (Fig. 11). A spring-pressed contact 89 is adapted to engage the contact 79 and a spring-pressed brush or contact 90 is in engagement continuously with contact 81. During the time that contacts 79 and 81 are in engagement the circuit of the pump motor will be closed to cause pumping of the pasteurized milk from a container, while the pipe 28 is in the container, and when said pipe has been raised from the container to be inserted in an adjacent container containing pasteurized milk the contact 81 will engage the installation at 80$a$ to break the motor circuit and stop the pump until the pipe 28 is again lowered into a container containing pasteurized milk, whereupon the contact 81 will again engage the contact 79 to start the pump for discharging of the last named container, and so on successively. The power circuit 91 supplies the motor 76 and the arrangement illustrated in Fig. 11 is such that a remote control automatic relay switch 92, of any well-known character, causes current of suitably low voltage to flow through the control circuit 93 that includes the contact 81 and 90.

In accordance with my improvements pasteurization of milk may be carried out in a continuous manner and without danger of contamination of the pasteurized milk by contact with any unpasteurized or unheated milk because the pipes 11 and 28 do not come in contact with any unheated or untreated milk nor do the fittings and valves connected with said pipes. Assuming that all of the seven containers are empty and it is desired to hold the previously heated milk at a temperature of say 142° F. for a period of say 30 minutes, the shaft 67 will be started and at the appropriate time the pipes 11 and 28 will be lowered into adjoining containers 1 and as the pipe 11 has properly entered a container the milk will flow from the pipe 10 through pipe 11 into said container. In the example illustrated, the rotation of the pipe 29 is intermittent or step by step, and timed so that the pipes 11 and 28 will remain in the containers for intervals of five minutes and the time of rotation of pipe 29 will be twenty seconds, during which twenty seconds the pipes 11 and 28 will be raised from the containers, rotated from one container to the next adjacent container and lowered into the latter. After the first charged container has been held thirty minutes, all containers being successively charged, the discharge pipe 28 will be entered into the said container and the pump 74 will cause the pasteurized milk from such container to be discharged, and so on thereafter each time pipe 28 is entered into a container in which the milk has been held for thirty minutes. During the time that a container is being discharged the next adjacent container is being charged with heated milk. In other words, after the containers have all been charged, each time that the pipes 11 and 28 are lowered into adjacent containers one of the latter will be discharged of pasteurized milk through pipe 28 and the previously discharged container will be charged with heated milk, the discharging of respective containers occurring substantially simultaneously, whereby the holding of the milk for the desired period of thirty minutes at the desired temperature may be effected and the operation may be carried on continuously from container to container.

A shell at 94 surrounds the lower portion of the mechanism and is provided with a door at 95 for access to the mechanism. A platform at 96 permits the operator to inspect the upper mechanism as well as the containers and steps at 97 permit access to the platform. At 98 is a removable cover over shell 3 through which the upper portion of fitting 12 and adjacent parts project, and 99 is a dome adapted to be detachably fitted over the fittings. The parts 98 and 99 protect the mechanism from air and contamination during pasteurization.

By means of the construction described and particularly with respect to the rotatively supported pipes 11 and 28 with their valves for controlling the flow of milk to and from the milk containers or holding tanks, the construction of the pasteurizer is simplified and the cost reduced.

Having now described my invention, what I claim is:—

1. A milk pasteurizing apparatus comprising a series of containers, a pipe pivotally supported to move into and out of the containers, devices movably supporting said pipe to move the latter from above one container to a position above another container, devices to rotate said pipe to cause it to enter and recede from said containers, and means to control the flow of milk through said pipe when the latter is within a container and to stop the flow of milk through said pipe when the latter is without a container.

2. A milk pasteurizing apparatus as set forth in claim 1, provided with a pump connected with said pipe to cause flow of milk through the latter and means to cause operation of said pump when the pipe is within a container and to stop operation of the pump when the pipe is without the container.

3. A milk pasteurizing apparatus comprising a series of containers, a pair of pipes pivotally supported to enter and recede from adjacent containers, means to rotate said pipes to cause them to enter and recede from adjacent containers, means to conduct milk to one of said pipes, means to discharge milk from a container through the other of said pipes and means to cause said pipes to move relatively to said containers for positioning the pipes above adjacent containers.

4. A milk pasteurizing apparatus as set forth in claim 3, provided with means to cause operation of the milk discharge means when the corresponding pipe is within a container and to stop operation of said discharge means when the pipe is without the said container.

5. A milk pasteurizing apparatus comprising a series of containers, a valve having a rotative member provided with a bore, means to supply milk to said bore, a pipe connected with said member and communicating with said bore; means to rotate said valve member to cause the pipe to enter and recede from the containers, and means to move said valve and pipe from a position above one container to a position above another container.

6. A milk pasteurizing apparatus as set forth in claim 5 in which the valve comprises a casing having a tapering seat and a member having a tapering portion co-operative with said seat and a spring cooperative with said casing and member for retaining the latter against the seat and permitting rotation of said member.

7. A milk pasteurizing apparatus comprising a series of containers a fitting having a branch provided with communicating bores; rotatable valve-means carried by said branch and provided with a bore for communication with the first named bores, a pipe connected with said valve for the flow of milk through the valve and pipe, means to rotate the valve to cause the pipe to swing into a container and out therefrom, the valve permitting flow of milk through the pipe when the latter is in a container and stopping the flow of milk through the pipe when the latter is without said container, means to supply milk to said fitting, and means to rotate said fitting, valve and pipe to present the latter over different containers.

8. A milk pasteurizing apparatus comprising a series of containers, a fitting having a branch provided with communicating bores, valve means carried by said branch and provided with a bore for communication with the first named bores a pipe connected with said valve for the flow of milk through the valve and pipe, means to operate the valve to cause the pipe to enter a container and recede therefrom, the valve permitting flow of milk through the pipe when the latter is in a container and stopping the flow of milk through the pipe when the latter is without said container; means to supply milk to said fitting, means to rotate said fitting, valve and pipe to present the latter over different containers, the fitting having another bore out of communication with the first named bores, said fitting having a second branch provided with a bore communicating with the last named bore, the second branch being provided with a valve for communication with the bore in said branch, a pipe connected with the second named valve for the flow of milk through the valve and pipe, means to operate the second named valve to cause its pipe to enter a container and recede therefrom, the valve permitting flow of milk through the pipe when the latter is in the container and stopping the flow of milk through the pipe when the latter is without said container, and means to cause the discharge of milk from a container when the second named pipe is therein.

9. A milk pasteurizing apparatus comprising a series of containers, a fitting having a valve, an inlet pipe communicating with said fitting, means rotatively retaining said fitting and inlet pipe for the flow of milk from the latter to the former, a supply pipe connected with said valve adapted to enter and recede from the containers, an arm connected with said valve to operate said valve and its pipe, a crank pin operatively connected with said arm to rock the latter, means rotatively supporting said fitting, means to operate said crank pin to cause said pipe to enter and recede from containers, and means to rotate said fitting valve and pipe when said pipe is without a container.

10. A milk pasteurizing apparatus comprising a series of containers, a fitting having spaced rotatable valves arranged to be simultaneously positioned above adjacent containers, an inlet pipe communicating with said fitting and a discharge pipe communicating with said fitting without communication with the inlet pipe, means rotatively connecting the inlet pipe and the fitting, a supply pipe connected with one valve and a discharge pipe connected with the other valve, said pipes being adapted to swing about the axes of said valves to enter and recede from spaced containers, an arm connected with each valve to operate the latter and its pipe, a slide member operatively connected with said arms to rock the latter, an outlet pipe connected with the fitting, means to reciprocate said member for rocking said valves, and means to rotate said fitting, valves and supply and discharge pipes when the latter are without the container.

11. An apparatus as set forth in claim 10, provided with links pivotally connecting the valve arms with the slide member.

12. An apparatus as set forth in claim 10, in which the slide member is slidably guided by the outlet pipe, said member having an annular groove, a projection in said groove to operate said member, a slide block carrying said projection, and means to reciprocate said slide block for causing rocking of said valves.

13. A milk pasteurizing apparatus comprising a series of containers, a pipe pivotally supported to move into and out of the containers, devices movably supporting said pipe to move the latter from above one container to a position above another container, devices to rotate said pipe to cause it to enter and recede from said containers, and means to control the flow of milk through said pipe when the latter is within a container and to stop the flow of milk through said pipe when the latter is without a container, said containers having depressions to receive the lower end of the pipe.

14. A milk pasteurizing apparatus comprising a series of containers, supply and discharge pipes for the containers, spaced rotatable valves carrying said supply and discharge pipes, means rotatively supporting said valves to present said pipes over pairs of containers successively, devices to operate said valves to cause the pipes to swing into and out of the containers including gearing and means to rotate said gearing intermittently, and means actuated by said gearing to rotate said valves and pipes when the latter are out of said containers to present the pipes above other pairs of said containers.

15. A milk pasteurizing apparatus as set forth in claim 14, provided with an outlet pipe to communicate with said discharge pipe and operatively connected with said valves to rotate the latter around the axis of the outlet pipe, said outlet pipe having a gear, and a gear in mesh therewith and operative with the first named gearing for rotating said outlet pipe, valves and supply discharge pipes when the last named pipes are without the containers.

16. A milk pasteurizing apparatus comprising a series of containers, supply and discharge pipes for the containers, spaced valves carrying said supply and discharge pipes, means rotatively supporting said valves to present said pipes above pairs of containers successively, devices to operate said valves to cause said pipes to enter and recede from the containers, means to rotate said valves and pipes when the latter are out of said containers to present the pipes above other pairs of said containers, an outlet pipe for communication with said discharge pipe, a pump connected with the outlet pipe, a motor to operate the pump, a supply circuit for the motor, a contact operative with the first named means and having spaced ends, a contact to engage the first named contact, an annular contact in circuit with the first named contact, a brush engaging the annular contact, a control circuit including the second named contact and the brush, and an automatic relay switch in said control circuit and said supply circuit to control the supply circuit of the motor to cause the latter to operate the pump when the supply and discharge pipes are within the containers and to stop operation of the pump when said pipes are without the containers.

17. Milk treating apparatus comprising a series of jacketed chambers in combination with a pipe system having infeeding and outfeeding pipe sections provided with supply and exhaust connections, each set of pipe sections including one member permitting swinging movement upon a horizontal axis, and another member permitting swinging movement upon a vertical axis, each such member being ported for milk flow therethrough; each set of pipe sections also having one member of a length substantially equal to the depth of the jacketed chambers and adapted to swing into and out of an associated chamber upon the axis of its horizontal pivot member, and means for actuating said pipe section to swing them into and out of said chambers successively.

18. Milk treating apparatus including the combination with a series of chambers adapted to receive the milk to be treated, and a set of swinging out-feeding and in-feeding pipes having an elbowed supporting and communicating connection pivoted for swinging movement about a horizontal axis to allow said pipes, in one position, to extend to the bottom portions of adjacent chambers and in another position to extend wholly above said chambers, and means for transferring the pipes respectively to other adjacent chambers when in the last mentioned position.

19. Milk treating apparatus comprising an annular series of treating chambers and a set of out-feeding and in-feeding pipe sections each having a horizontally pivoted elbowed member and a pipe arm adapted to swing in a vertical plane about the axis of the pivot into and out of pairs of adjacent chambers in the series, said pipe arms also having a common feeding member pivoted for swinging movement about a vertical axis when the elbowed arms are raised above said chambers, and timed mechanism for automatically moving said sections in successive lifting transferring and re-inserting operations for filling and emptying said chambers successively.

20. Milk treating apparatus comprising the combination of an annular series of jacketed treating chambers, a centrally disposed delivery pipe, a rotary head at the upper end of the delivery pipe provided with a cavity in communication with said pipe, and another cavity provided with an inlet port, a set of pipes movably connected with said head in communication with the respective cavities and adapted to swing in vertical planes, said set of pipes being disposed for movement into and out of adjacent milk chambers in the series, whereby when moved out of certain chambers they may be transferred to other chambers of the series by a rotative movement of said head.

21. Milk treating apparatus comprising the combination with a liquid container having a central vertically disposed tubular passage, an annular series of milk chambers grouped about said central passage within the container and having radially extending side walls spaced from those of adjacent chambers in the series, an outlet duct extending vertically through said tubular passage and provided with a chambered head rotatively supported at its upper end, said head having a plurality of chambers, one connected with said outlet duct and the other connected with a source of supply, swinging pipe connection leading from the respective chambers in the head and adapted in one position to connect such chambers with the bottom portions of adjacent milk treating chambers, and mechanical means for successively lifting said pipe sections from the milk treating chambers, imparting a partial rotation to the head and lowering said sections into adjacent chambers in a cycle of timed operations.

22. In a milk treating apparatus, the combination of a container having a tubular passage therethrough along its vertical center line, an annular series of closed bottom milk chambers in said container, a rotative pipe connection extending through said passage and provided with a head ported to receive milk from above for one of said chambers and to deliver it from another downwardly through said pipe, said head having relatively adjustable pipe connections movable into and out of registering chambers, power driven means for effecting a relative rotative step by step adjustment of said pipe head with reference to said series of chambers, and actuating connections extending through said passage for moving said pipe connections into and out of chambers successively and independently of the head movement.

23. In a milk treating apparatus, the combination with a milk receiving chamber, of pipe connections having a member with one end pivotally supported above and in proximity to one corner of said chamber, the depth and width of said chamber being such as to allow the free end of the pipe connection to be swung from a point in proximity to the chamber bottom to a point above the chamber.

24. In a milk treating apparatus, the combination with an annular series of milk chambers having side walls convergent toward a cylindrical central space about which said chambers are grouped, and supply and exhaust pipe connections having members pivoted to a rotary support and adapted to be swung upon their pivotal axes into positions with their free ends in the apices formed by said convergent walls each in close proximity to the bottom of its associated chamber, said chambers extending radially to a sufficient distance to allow the free ends of the pipes to be swung upwardly to positions above said chambers.

25. In a milk treating apparatus, the combination of a milk receiving chamber having its bottom downwardly inclined at one corner, and means for swinging supply and exhaust pipe connections downwardly into said chamber with their free ends in proximity to said inclined portions of the bottom.

26. In a milk treating apparatus of the described class, the combination of a pipe connection rotatable about a vertical axis and provided with two sets of passages, one having a supply connection and the other having an exhaust connection, said passages being provided at their other ends with members pivoted to swing about horizontal axes and provided respectively with a feed pipe in communication with the supply connection and a suction pipe in communication with the exhaust connection through said pivoted members and pipe connection.

CHARLES EDWARD NORTH.